(12) United States Patent
Kolios et al.

(10) Patent No.: US 8,697,016 B2
(45) Date of Patent: Apr. 15, 2014

(54) REACTOR FOR CARRYING OUT AUTOTHERMAL GAS-PHASE DEHYDROGENATIONS

(75) Inventors: Grigorios Kolios, Neustadt (DE); Wilhelm Ruppel, Mannheim (DE); Ulrike Wegerle, Worms (DE); Jasmina Kessel, Mannheim (DE); Wolfgang Gerlinger, Limburgerhof (DE); Godwind Tafara Peter Mabande, Limburgerhof (DE); Goetz-Peter Schindler, Ludwigshafen (DE); Albena Kostova, Mannheim (DE); Gerhard Olbert, Dossenheim (DE); Peter Pfab, Neustadt (DE)

(73) Assignee: BASF SE (DE)

( * ) Notice: Subject to any disclaimer, the term of this patent is extended or adjusted under 35 U.S.C. 154(b) by 530 days.

(21) Appl. No.: 12/957,618

(22) Filed: Dec. 1, 2010

(65) Prior Publication Data

US 2011/0130607 A1    Jun. 2, 2011

(30) Foreign Application Priority Data

Dec. 1, 2009  (EP) ................................. 09177649

(51) Int. Cl.
*B01J 8/04* (2006.01)
*C07C 5/333* (2006.01)

(52) U.S. Cl.
USPC .......... 422/628; 422/600; 422/621; 422/633; 422/644; 422/649; 422/240; 422/198; 585/380; 585/616; 585/654

(58) Field of Classification Search
USPC ......... 422/600, 621, 628, 633, 644, 649, 240, 422/198; 585/380, 616, 654
See application file for complete search history.

(56) References Cited

U.S. PATENT DOCUMENTS 7,034,195 B2    4/2006  Schindler et al.
2008/0119673 A1  5/2008  Hechler et al.

FOREIGN PATENT DOCUMENTS

DE    4026566 A1    2/1992

*Primary Examiner* — Lessanework Seifu
(74) *Attorney, Agent, or Firm* — Novak Druce Connolly Bove + Quigg LLP (57) ABSTRACT

A reactor in the form of an essentially horizontal cylinder for carrying out an autothermal gas-phase dehydrogenation of a hydrocarbon-comprising gas stream by means of an oxygen-comprising gas stream to give a reaction gas mixture over a heterogeneous catalyst configured as monolith is disclosed herein. The interior of the reactor is divided by a detachable, cylindrical or prismatic housing which is arranged in the longitudinal direction of the reactor, gastight in the circumferential direction and open at two end faces of the housing into an inner region, having one or more catalytically active zones. In each case, a packing composed of monoliths may be stacked on top of one another, next to one another, and above one another and before each catalytically active zone. Also in each case, a mixing zone having solid internals and an outer region arranged coaxially to the inner region are provided.

17 Claims, 8 Drawing Sheets

REACTOR FOR CARRYING OUT AUTOTHERMAL GAS-PHASE DEHYDROGENATIONS

The invention relates to a reactor for carrying out autothermal gas-phase dehydrogenations using a heterogeneous catalyst configured as a monolith and also a process using the reactor.

Ceramic or metallic monoliths have become established as catalyst supports for noble metal catalysts in mobile and stationary offgas purification. The channels offer a low resistance to flow and at the same time uniform accessibility to the outer catalyst surface for gaseous reaction media. This is advantageous compared to disordered beds in which a large pressure drop results from numerous deflections in the flow around the particles and the catalyst surface may not be uniformly utilized. The use of monoliths is generally of interest for catalytic processes having high volume flows under adiabatic reaction conditions at high temperatures. In chemical process technology, these features apply particularly to dehydrogenation reactions which occur in the temperature range from 400° C. to 700° C.

Progress in catalyst technology has made selective combustion of the dehydrogenation hydrogen in the presence of hydrocarbons possible, as described, for example, in U.S. Pat. No. 7,034,195. Such a mode of operation is referred to as autothermal dehydrogenation and allows dehydrogenation reactors to be heated directly, so that complicated apparatuses for indirect preheating and intermediate heating of the reaction mixture become unnecessary. One such process is described, for example, in US 2008/0119673. However, this process has the serious disadvantage that the dehydrogenation is carried out over a heterogeneous catalyst in pellet form: the high flow resistance of beds of pellets requires a large reactor cross section and a correspondingly low flow velocity in order to limit the pressure drop in the catalytically active layer. This disadvantage is compensated by a very complicated apparatus for introducing and distributing the oxygen, which impairs the advantage of autothermal dehydrogenation.

The U.S. patent application 61/179,918, which is not a prior publication, discloses heterogeneous catalysts in the form of monoliths for use in autothermal gas-phase dehydrogenations of hydrocarbons.

Proceeding from the above patent application which is not a prior publication, it was an object of the present invention to provide a conclusive concept for use of the heterogeneous catalysts configured as monolith in reactors for carrying out autothermal dehydrogenations of the streams comprising hydrocarbons on an industrial scale, which ensures safe control of the combustible reaction media at high reaction temperatures, frequently in the range from about 400 to 700° C., and also easy accessibility and handling of the monoliths, in particular on equipping the reactor and also on changing the catalyst.

This object is achieved by a reactor in the form of an essentially horizontal cylinder for carrying out an autothermal gas-phase dehydrogenation of a hydrocarbon-comprising gas stream by means of an oxygen-comprising gas stream to give a reaction gas mixture over a heterogeneous catalyst configured as monolith, wherein the interior of the reactor is divided by a gastight, cylindrical or prismatic housing G which is arranged in the longitudinal direction of the reactor and is gastight in the circumferential direction and open at two end faces of the housing into an inner region A having one or more catalytically active zones, in which a packing composed of monoliths stacked on top of one another, next to one another and above one another and before each catalytically active zone in each case a mixing zone having solid internals are provided, and an outer region B arranged coaxially to the inner region A, with one or more feed lines for the hydrocarbon-comprising gas stream to be dehydrogenated into the outer region B, deflection of the hydrocarbon-comprising gas stream to be dehydrogenated at one end of the reactor and introduction via a flow equalizer into the inner region A, with one or more feed lines which can be regulated independently of one another, where each feed line supplies one or more distribution chambers for the oxygen-comprising gas stream into each of the mixing zones and with a discharge line for the reaction gas mixture of the autothermal gas-phase dehydrogenation at the same end of the reactor as the feed line for the hydrocarbon-comprising gas stream to be dehydrogenated.

It has been found that it is important to configure a reactor for use of heterogeneous catalysts in the form of monoliths for carrying out autothermal gas-phase dehydrogenations in such a way that the interior of the reactor is divided into an inner region A and an outer region B which concentrically surrounds the inner region A by means of a gastight cylindrical or prismatic housing G which is arranged in the longitudinal direction of the reactor and is open at both end faces of the housing, so that it is possible to introduce the hydrocarbon feed stream into the outer region B, deflect it and introduce it together with the oxygen-comprising gas stream into the inner region A of the reactor with the stream flowing through the reactor and the reaction mixture of the autothermal gas-phase dehydrogenation being taken off from the inner region A at the other end of the reactor.

The hydrocarbon-comprising gas stream to be dehydrogenated is preferably introduced at one end of the reactor, deflected at the other end of the reactor and introduced via a flow equalizer into the inner region A.

For the present purposes, a monolith is a one-piece, parallelepipedal block having a plurality of continuous channels which are arranged parallel to one another and have a narrow cross section in the range from about 0.5 to 4 mm.

The monoliths are preferably formed by a ceramic material as support material onto which a catalytically active layer has been applied, preferably by the washcoating process.

The most usual material for monolithic structures is cordierite (a ceramic material comprising magnesium oxide, silicon oxide and aluminum oxide in a ratio of 2:5:2). Other materials of which commercially available monolithic structures are made are metals, mullite (mixed oxide of silicon oxide and aluminum oxide, ratio=2:3) and silicon carbide. These materials have, like cordierite, a low specific BET surface area (BET=Brunauer, Emmet and Teller) (e.g. typically 0.7 $m^2$/g for cordierite).

Monolithic ceramic elements having cell counts of 25-1600 cpsi (cells per square inch, corresponds to a cell size of 5-6 mm) can be obtained. Use of a higher cell count increases the geometric surface area, so that the catalyst can be used more efficiently. Disadvantages of higher cell counts are a somewhat more difficult production process, difficult washcoat coating and a higher pressure drop over the reactor. However, the pressure drop remains very low for monoliths having a high cell count compared to a reactor packed with random packing elements (generally a factor of 10 lower), which can be attributed to the straight channels in the monolith.

To produce monolithic ceramic elements, it is possible to produce a mixture of talc, clay and an aluminum oxide-supplying component and silicon oxide, mix the mixture to form a molding composition, shape the mixture, dry the raw product and heat it at a temperature of from 1200 to 1500° C. to give a ceramic which comprises mainly cordierite and has a low coefficient of thermal expansion. Generally speaking, a paste having appropriate rheological properties and an appropriate rheological composition can be extruded to form a monolithic support. The paste generally comprises a mixture of ceramic powders of suitable size, inorganic and/or organic additives, solvent (water), peptizing agent (acid) to set the pH and a permanent binder (colloidal solution or sol). The additives can comprise a plasticizer or a surfactant for adjusting the viscosity of the paste or a temporary binder which can later be burned out. Glass or carbon fibers are sometimes added to increase the mechanical strength of the monolith. The permanent binder should improve the internal strength of the monolith.

Cordierite monoliths can be produced from a batch comprising talc, kaolin, calcined kaolin and aluminum oxide and together give a chemical compound composed of from 45 to 55% by weight of $SiO_2$, from 32 to 40% by weight of $Al_2O_3$ and from 12 to 15% by weight of MgO. Talc is a material which consists mainly of magnesium silicate hydrate, $Mg_3Si_4O_{10}(OH)_2$. The talc can, depending on the source and purity, also be associated with other minerals such as tremolite ($CaMg_3(SiO_3)_4$), serpentine ($3MgO.2SiO_2.2H_2O$), anthophyllite ($Mg_7(OH)_2(Si_4O_{11})_2$), magnesite ($MgCO_3$), mica and chlorite.

Monoliths composed of other materials such as SIC, $B_4C$, $Si_3N_4$, BN, AlN, $Al_2O_3$, $ZrO_2$, mullite, Al titanite, $ZrB_2$, sialon, perovskite, carbon and $TiO_2$ can also be produced by extrusion.

Parameters in the extrusion which are important in respect of the properties of the monolith products are not only the quality of the nozzle and the type and properties of the materials used for producing the formable mixture but also the additives added, the pH, the water content and the force used in extrusion. The additives employed in extrusion are, for example, celluloses, $CaCl_2$, ethylene glycols, diethylene glycols, alcohols, wax, paraffin, acids and heat-resistant inorganic fibers. Apart from water, it is also possible to use other solvents such as ketones, alcohols and ethers. The addition of additives can lead to improved properties of the monoliths, for example formation of microcracks, which improves the thermal shock resistance, improved porosity and better absorption capacity and increased mechanical strength or low thermal expansion.

The bare monolithic structure is coated with a catalyst support layer comprising one or more ceramic oxides or a catalyst layer comprising the catalytically active metals and the optional further (promoter) elements already supported on the ceramic oxide support material, with the coating being produced by a washcoat coating method.

The macroporous structure of ceramic monoliths aids the anchoring of the washcoat layer. The way of coating with the washcoat can be carried out by two methods: the macroporous support can be (partly) filled with the washcoat material having a large surface area or a washcoat can be deposited as a layer in the pores of the ceramic support. The filling of the pores leads to a very strong interaction between monolith and washcoat since the major part of the washcoat layer is actually fixed in the pores of the support and not only bound to the outer surface of the monolith channels. This manner of coating is carried out using a solution (or a sol) of the material to be deposited or using a solution comprising very small colloidal particles. The disadvantage of carrying out the coating by filling of the pores is that the amount of coating which can be deposited is limited since the pores become completely filled at some time and the washcoat becomes inaccessible.

Monoliths offer favorable conditions for carrying out the autothermal dehydrogenation of hydrocarbons: in particular, narrower reactor cross sections and higher flow velocities compared to randomly packed fixed beds can be achieved, so that effective, progressive introduction of the oxygen into the hydrocarbon-comprising main stream is possible. The flow direction of the main stream through the reactor is not limited to downward flow, as in the case of randomly packed fixed beds.

After a relatively long period of operation, the catalysts recommended in the present text can normally be regenerated in a simple manner, for example by first passing air which is (preferably) diluted with nitrogen and/or steam through the fixed catalyst bed at an inlet temperature of from 300 to 600° C. (in extreme cases up to 750° C.), frequently from 500 to 600° C., in first regeneration steps. The space velocity of regeneration gas over the catalyst can (based on the total amount of catalyst regenerated) be, for example, from 50 to 10 000 $h^{-1}$ and the oxygen content of the regeneration gas can be from 0.5 to 20% by volume.

It is then generally advisable to continue regeneration using pure molecular hydrogen or using molecular hydrogen diluted with inert gas (preferably steam and/or nitrogen) under otherwise identical conditions (the hydrogen content should be ≥1% by volume).

The housing is advantageously made of a material which is mechanically and chemically stable at the high reaction temperature, frequently in the range from about 400 to 700° C., and also has no catalytic activity for the autothermal gas-phase dehydrogenation.

The housing is preferably made of a material which is heat-resistant but does not have pressure vessel approval, in particular an alloy steel comprising stainless steel having, as alloying elements, from about 1.5 to 2.5% of silicon and also nickel and chromium, preferably in a nickel/chromium ratio in the range from 0.5 to 2.0, more preferably from 0.8 to 1.0, particularly preferably from 0.8 to 0.85, in particular a stainless steel having the material number 1.4835, 1.4854 or very particularly preferably 1.4841.

The housing should be very thin in order to ensure very good heat transfer between the outer region B and the inner region A.

The housing can preferably be installed unfastened in the reactor.

The housing is preferably configured as a cuboid.

The side walls of the housing configured as a cuboid are preferably configured so as to be removed individually so that a complete packing or individual monoliths of a packing in a catalytically active zone can be replaced.

According to the invention, the individual monoliths are stacked beside one another, above one another, and behind one another in the required number in order to fill out a catalytically active zone and form a packing.

At least one mixing zone having fixed internals which are not catalytically active is provided before each packing. Mixing of the stream comprising the hydrocarbon-comprising gas stream with the oxygen-comprising stream occurs in the mixing zone, with mixing of the oxygen-comprising gas stream with the hydrocarbon-comprising feed stream occurring in the first mixing zone in the flow direction and intermediate introduction of an oxygen-comprising gas stream into the hydrocarbon-comprising reaction gas mixture yet to be dehydrogenated being carried out in each of the subsequent (in the flow direction) mixing zones.

As a result of the reactor being designed as an essentially horizontal cylinder, the inner space B which comprises the monolith packings is supported over a large area and thus subjected to decreased mechanical stress. Furthermore, this reactor design makes accessibility to the individual monolith packings easier.

The monoliths which are stacked next to one another, above one another and behind one another to form a packing are preferably enclosed in an expandable mat or in a mineral fiber nonwoven and inserted in a casing having a clamping device. As mineral fiber nonwovens, preference is given to using nonwovens as are known for use for offgas catalysts, for example Interam® mats from 3M®.

Expandable mats are known from catalytic offgas purification and are described, for example, in DE-A 40 26 566: they consist essentially of ceramic fibers with embedded mica. As a result of the embedded mica, the expandable mat seeks to expand at increasing temperatures, as a result of which the body enveloped therein is held particularly securely even at elevated temperatures.

The mineral fiber nonwovens or expandable mats are selected so that they expand on heating and seal the generally ceramic monoliths against the housing, in particular prevent rubbing of the monoliths against the housing and bypass flow of the reaction gas mixture along the inner wall of the housing.

The outer wall of the reactor is preferably made of an alloy steel approved for pressure vessels, in particular an alloy steel having the material number 1.4541 or 1.4910, clad with an alloy steel having the material number 1.4841, or having a chamotte lining.

Each mixing zone preferably comprises a tube distributor formed by a plurality of parallel plug-in tubes which are arranged in a plane perpendicular to the longitudinal direction of the reactor and are connected with one or more of the distributor chambers and have a plurality of uniformly spaced outlet openings for exit of the oxygen-comprising gas stream from the plug-in tube, and also a plurality of uniformly spaced mixing elements.

The mixing elements can advantageously be configured as mixing plates.

At the end of the reactor at which the discharge line for the reaction gas mixture from the autothermal gas-phase dehydrogenation is arranged, it is advantageous to provide a shell-and-tube heat exchanger having a bundle of tubes through which the reaction gas mixture from the autothermal gas-phase dehydrogenation is passed and also intermediate spaces between the tubes through which the hydrocarbon-comprising gas stream to be dehydrogenated is passed in countercurrent to the reaction mixture from the autothermal gas-phase dehydrogenation.

The shell-and-tube heat exchanger is preferably made of a highly heat-resistant stainless steel, in particular a stainless steel having the material number 1.4910, the tubes of the shell-and-tube heat exchanger are advantageously installed at both ends in tube plates, preferably without leaving a gap by backplate welding, and the tube plates of the shell-and-tube heat exchanger are clad on the hot gas side of the plates with a heat-resistant stainless steel, in particular a stainless steel having the material number 1.4841.

The shell-and-tube heat exchanger is advantageously made of an Inconel® alloy.

The feed lines for the oxygen-comprising gas stream, the distributor chambers, the plug-in tubes and the mixing elements for the oxygen-comprising gas stream in each mixing zone are advantageously made of a highly heat-resistant nickel-chromium-iron alloy, where the total proportion by mass of nickel and chromium is at least 90% by weight of the total mass of the alloy and the nickel/chromium ratio is in the range from about 1.5 to 5.5, preferably about 2.0.

The material used for the feed lines and the distributor chambers is preferably an Inconel® alloy. In particular Inconel® 690, corresponding to the material number 2.4642.

A flow straightener is preferably arranged at the end face of the housing G at which the hydrocarbon-comprising gas stream is deflected from the outer region B into the inner region A.

The invention also provides a process for carrying out autothermal dehydrogenations using the above-described reactors.

In a preferred, fully continuous mode of operation, two or more reactors can be used, with at least one reactor being utilized for the autothermal gas-phase dehydrogenation and at the same time at least one further reactor being regenerated.

The autothermal gas-phase dehydrogenation is preferably a dehydrogenation of propane, butane, of isobutane, of butene to form butadiene or of ethylbenzene to form styrene.

The reactor of the invention and the process of the invention have, in particular, the advantages that an optimized reactor arrangement in respect of mechanical stressing, the handling or connection to peripheral apparatuses, safe control of the combustible reaction media with avoidance of temperature peaks and corresponding stressing of materials and also simple accessibility and handling of the individual monoliths is ensured. In addition, the reactor arrangement according to the invention makes optimal main and intermediate introduction of oxygen possible.

The invention makes it possible to carry out autothermal gas-phase dehydrogenations at lower capital and operating costs and to utilize monolith catalysts at higher loading and improved selectivity for autothermal gas-phase dehydrogenations.

The invention is illustrated below with the aid of a drawing.

In the drawing.

Identical reference numerals in the figures in each case denote identical or corresponding features.

Figure 1:
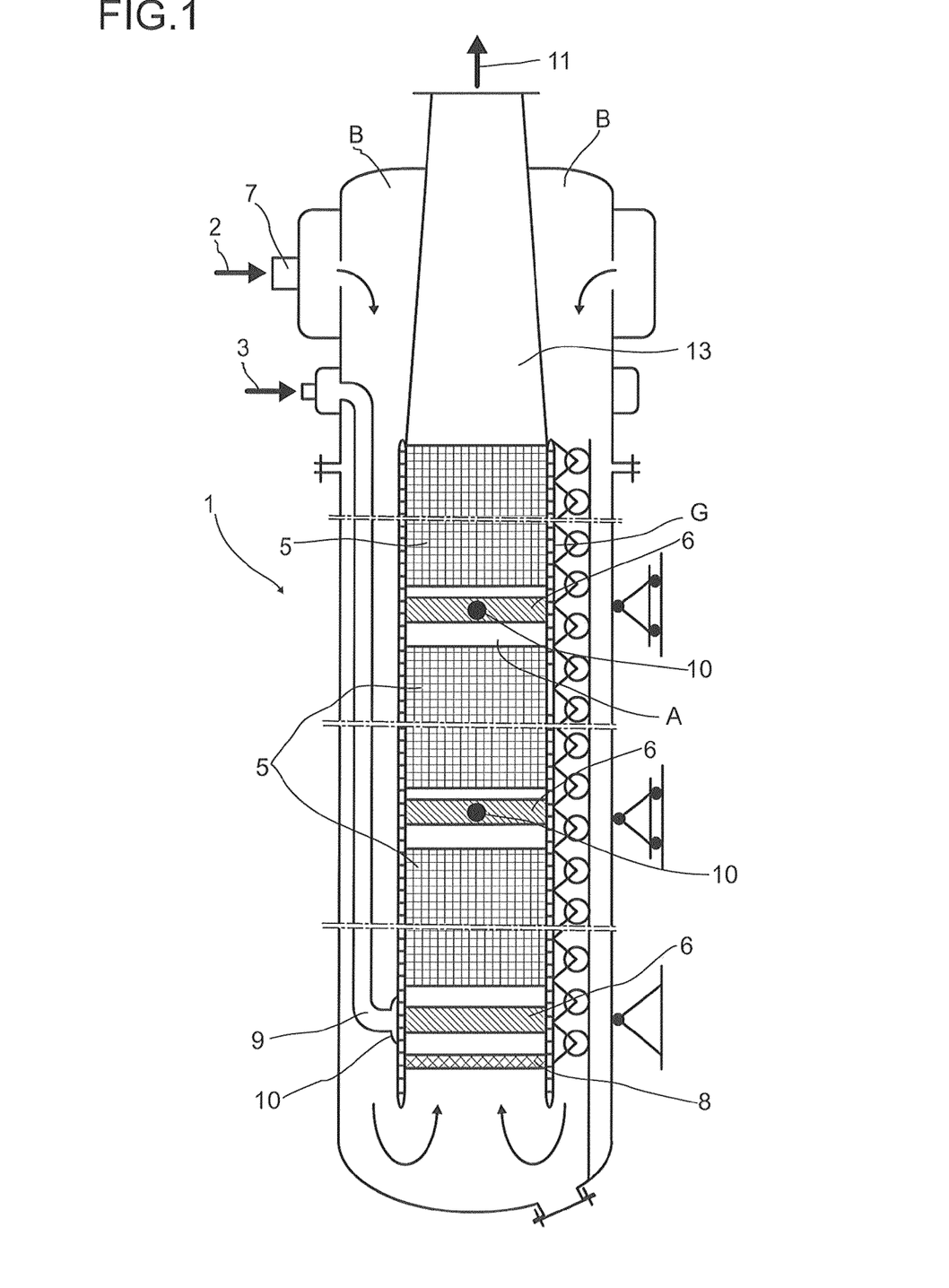
FIG. 1 shows a longitudinal section through a preferred embodiment of a reactor according to the invention in the vertical plane.

The longitudinal section in the vertical direction in FIG. 1 schematically shows a preferred embodiment of a reactor 1 according to the invention which is supplied with a hydrocarbon-comprising gas stream 2 to be dehydrogenated by a feed line 7 and an oxygen-comprising gas stream 3, with feed line 9 and distributor chamber 10.

A packing 5 with upstream mixing zone 6 in each case forms a reactor module.

A housing G arranged in the longitudinal direction of the reactor 1 divides the interior of the reactor 1 into an inner region A and an outer region B.

In the inner region A, monoliths 4 are stacked on top of, next to and behind one another to form, in each case, a packing 5, with a mixing zone 6 being provided in front of each packing 5.

The hydrocarbon-comprising gas stream 2 to be dehydrogenated flows into the outer region B at one end of the reactor 1 via the feed line 7, is deflected at the opposite end of the reactor and flows via a flow straightener 8 into the interior space A. The reaction takes place in the inner space A, within the housing G. The reaction gas mixture leaves the interior space A at the end opposite to that at which the hydrocarbon-comprising gas stream 2 to be dehydrogenated enters the interior space A and is taken off via a discharge line 11. A transition part 13 which acts as a transition from the preferred cuboidal geometry of the housing G as shown in the figure to the cylindrical geometry of the discharge line 11 is arranged between the discharge line 11 and the housing G.

It can also be seen from the figure that the individual reactor modules, each comprising a packing 5 made up of monoliths 4 stacked on top of, next to and behind one another and a mixing zone 6, are installed in the interior of the reactor in a movable fashion so that they can be pushed individually into the reactor 1. The individual modules are then joined to one another, if appropriate by screwing or welding, but in such a way that they can be separated again when required. The individual modules should preferably be joined to one another in a type of compensator in order to accommodate the thermal stresses in long-term operation.

Figure 2:
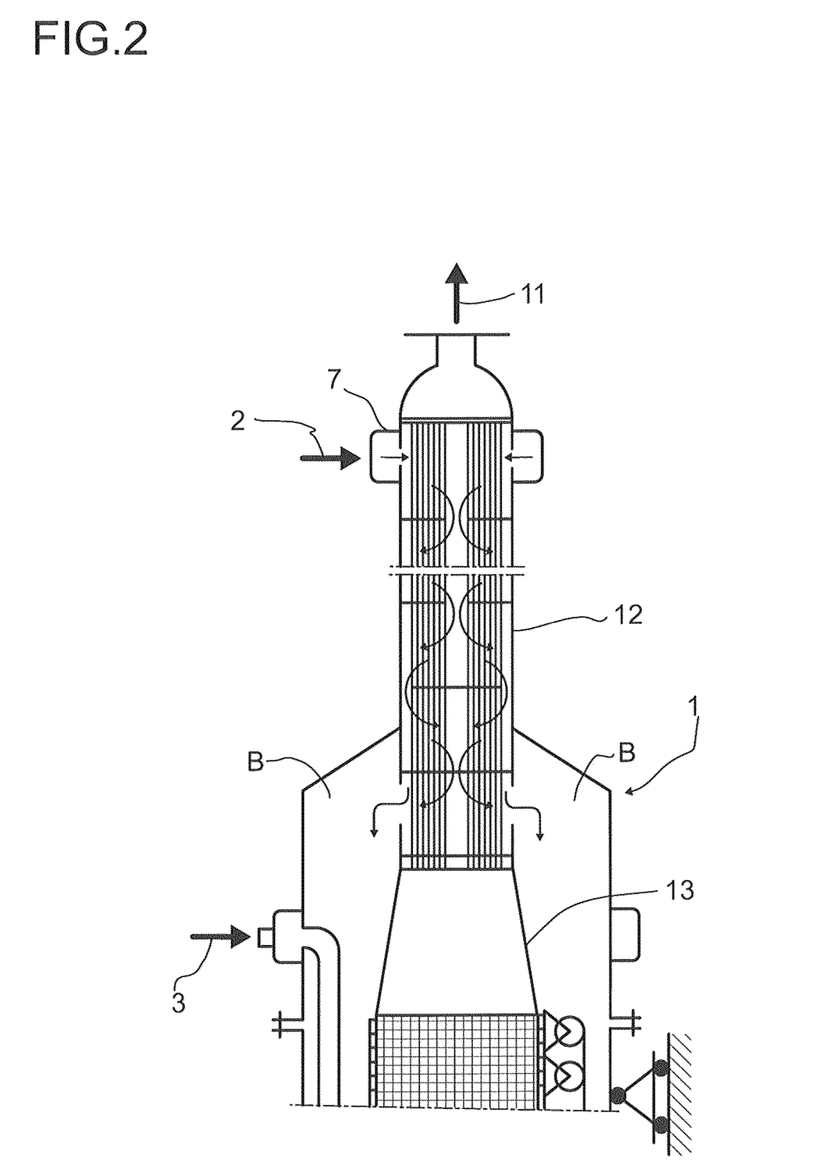
FIG. 2 shows part of a longitudinal section through a further preferred embodiment of a reactor according to the invention in the vertical plane.

FIG. 2 shows a part of a longitudinal section through a preferred embodiment of a reactor 1 according to the invention in the vertical direction, with integration of a heat exchanger 12 into the reactor 1. The reaction mixture flows through the tubes of the shell-and-tube heat exchanger and passes heat by indirect heat exchange to the feed stream, viz. the hydrocarbon-comprising gas stream 2 to be dehydrogenated, which flows in via an annular channel through openings in the heat exchanger wall into the wall region of the heat exchanger, flows around the tubes radially from the outside inward and from inside outward and is deflected in the inner tube-free region of the shell-and-tube heat exchanger, corresponding to the geometry of the latter. The preheated feed stream is subsequently passed through openings in the cylindrical outer wall of the shell-and-tube heat exchanger into the inner space D of the reactor 1. Depending on the thermal requirements, the heat exchanger can be fixed or configured as a floating head variant. The floating head variant requires appropriate sealing and has the advantage of accessibility of the system for the removal of the heat exchanger, in particular for maintenance work.

Figure 3:
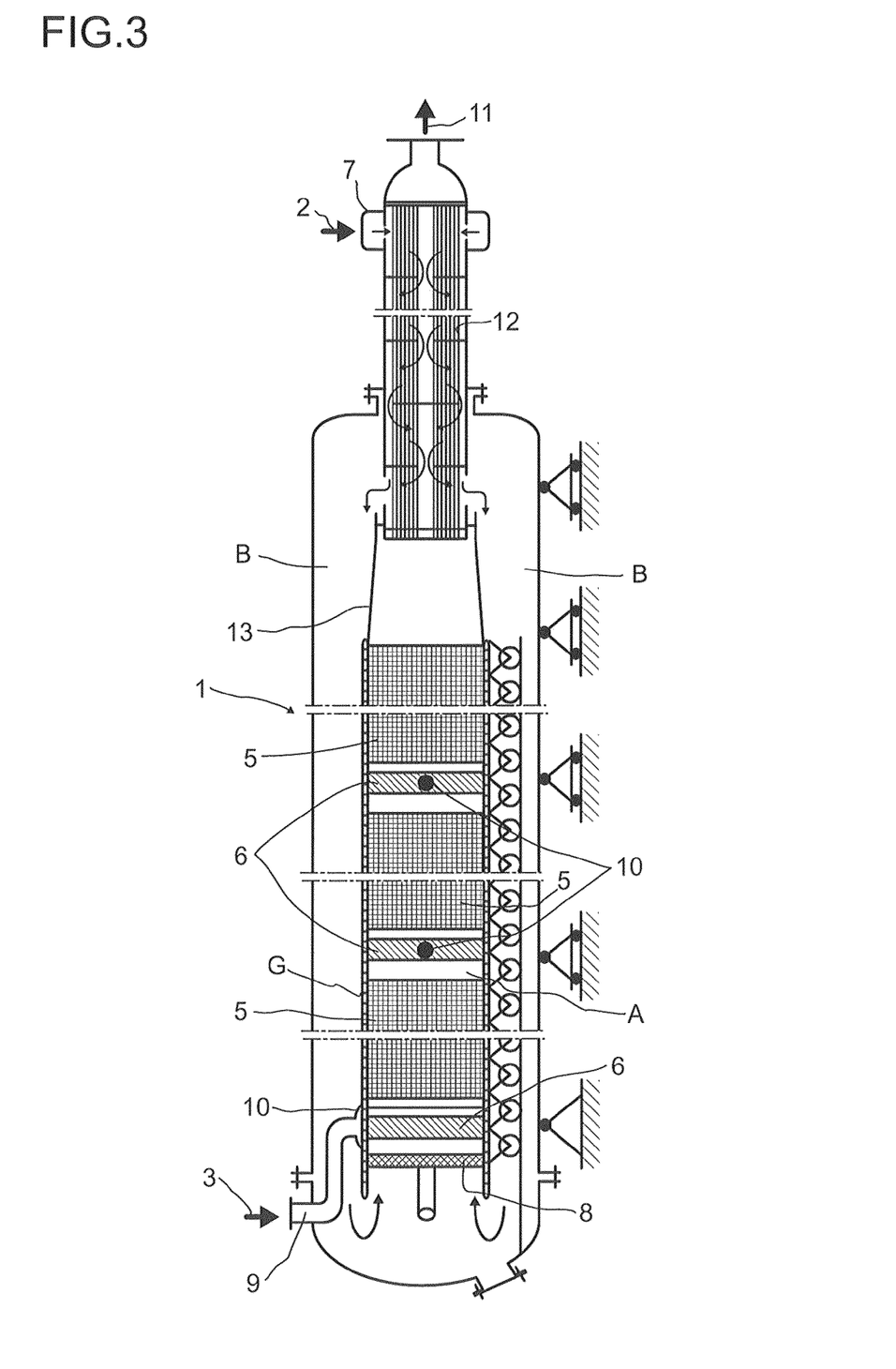
FIG. 3 shows a further preferred embodiment of a reactor according to the invention in the vertical plane.

FIG. 3 shows a further preferred embodiment of a reactor according to the invention in vertical longitudinal section, with withdrawable heat exchanger. As a result of the oxygen-comprising gas stream 3 being introduced via the feed line 9 with distributor chamber 10 at the end of the reactor 1 opposite to that at which the feed stream, viz. the hydrocarbon-comprising gas stream 2 to be dehydrogenated, is fed in, the heat exchanger 12 can be withdrawn from the reactor 1 in a simple manner. In this embodiment, the heat exchanger 12 has to be configured as a floating head which is then pushed in sideways after installation of the individual modules comprising in each case a packing comprising monoliths 5 and a mixing zone 6. However, this arrangement has the disadvantage that the feed lines 9, 10 for the oxygen-comprising gas 3 have to be welded or joined via an access passage via a manhole.

Figure 4:
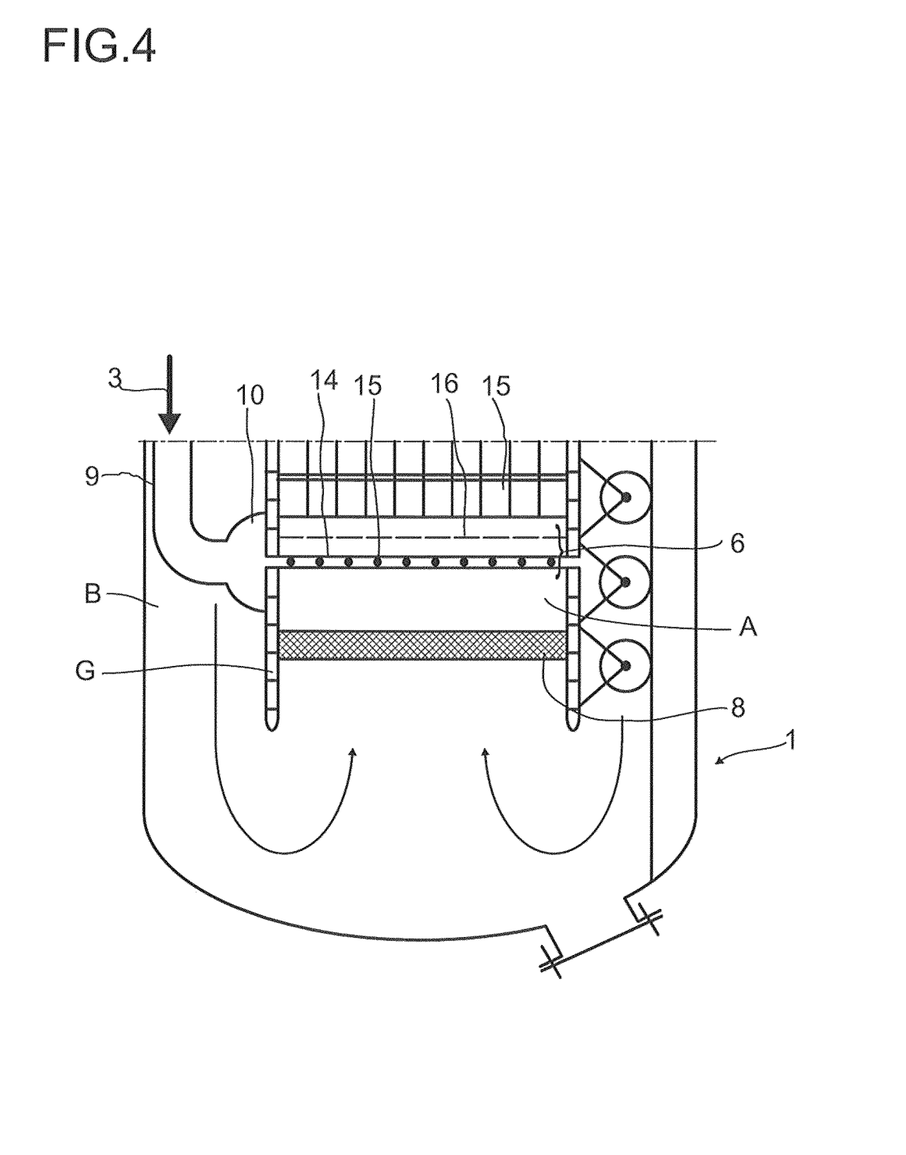
FIG. 4 shows part of a preferred embodiment of a reactor according to the invention in longitudinal section in the vertical plane.

The depiction in FIG. 4 of part of a vertical longitudinal section through a reactor 1 shows the region of the flow into the first (in the flow direction) reactor module. The figure shows the arrangement of the flow equalizer 8 and the first (in the flow direction) mixing zone 6 comprising a tube distributor of which a plug-in tube 14 is shown in longitudinal section, with uniformly spaced outlet openings 15 for the oxygen-comprising gas stream 3 from the plug-in tube 14.

Downstream of the tube distributor via which the oxygen-comprising gas stream 3 is injected via a feed line 9 and a distributor chamber 10 there are arranged, at a defined distance from the tube distributor, internals 16 which are configured as mixing elements 16. The internals 16 shorten the mixing-in time and the mixing length.

The mixing element can also have a defined porosity, i.e. the opening ratio is not uniform over the entire extension of the mixing element but is such that the residence time or the backflow region is reduced.

Figure 5:
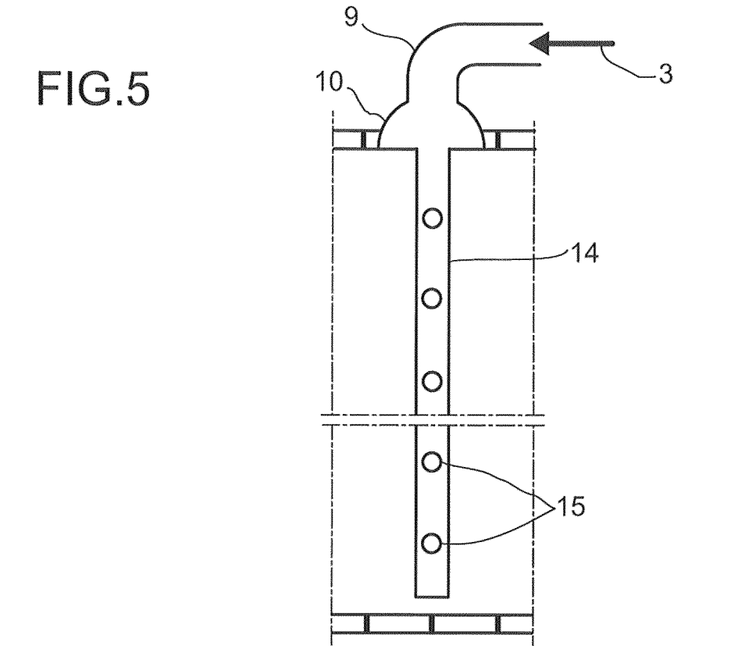
FIG. 5 shows a part of a longitudinal section through a reactor according to the invention in the region of a plug-in tube.

FIG. 5 shows a part of the tube distributor, with feed line 9 and distributor chamber 10 to the oxygen-comprising gas stream 3 and longitudinal section through a plug-in tube 14 into which gas flows via the distributor chamber 10 and which has outlet-openings 15 for the oxygen-comprising gas stream 3 from the plug-in tube 14.

In the figure, l denotes the length of the plug-in tube 14, d denotes the diameter of the plug-in tube 14, $d_L$ denotes the diameter of an outlet opening 15 and $s_L$ denotes the distance between two successive outlet openings 15.

Figures 6A, 6B:
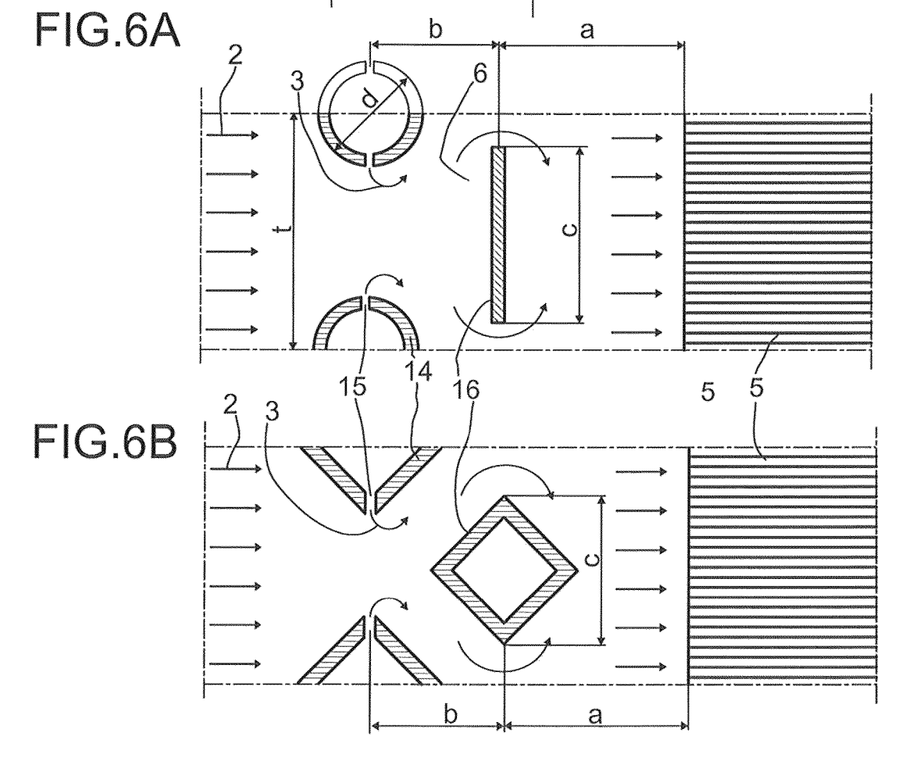
FIG. 6 shows a part of a longitudinal section in the horizontal direction through a reactor according to the invention in the region of a mixing zone 6, FIG. 7 schematically shows a packing made up of monoliths 4 stacked on top of one another and next to one another, with an enlarged view of the subregion circled in FIG. 7 in FIG. 7A, FIG. 8 schematically shows a part of a packing with a holding device between the monoliths

FIGS. 6A and 6B show two variants for preferred embodiments of the plug-in tube 14 and the mixing element 16:

The sectional views in FIGS. 6A and 6B are in each case in a plane perpendicular to the depiction in FIG. 5, i.e. they in each case show part of a longitudinal section in the horizontal direction through a reactor 1 according to the invention.

In the variant shown in FIG. 6A, the plug-in tubes 14 have a round cross section and the fixed internal at a distance therefrom is configured as mixing plate 16.

On the other hand, FIG. 6B shows a plug-in tube 14 which is configured as a four-sided tube and a mixing element 14 (volume body) as fixed internal at a distance therefrom to improve the quality of mixing.

In FIGS. 6A and 6B t denotes the distance of the midpoints of two successive plug-in tubes 14, a denotes the distance from the mixing plate or mixing element 16 to the packing 5, c denotes the width of the mixing plate or mixing element between two successive openings for passage of the oxygen-comprising gas stream 3 and e denotes the height of the mixing element in the flow direction.

The following preferred ratios apply to the above dimensions:

$t = F1 \cdot d$

F1=1-4
preferably F1=2.5

$b = F2 \cdot d$

F2=1-2
preferably F2=1.5

$a = F3 \cdot d$

F3=1-2
preferably F3=1.25

$c = F4 \cdot d$

F4=1.5-3.5
preferably F4=2.25

$l = F5 \cdot d$

F5=0.1-2
preferably F5=1.0

$\hat{s}_L = F6 \cdot d$

F6=0.2-0.5
preferably F6=0.25

$$d_L = \sqrt{\frac{0.2 \cdot F6 \cdot d^3}{l}}$$

Figure 7:
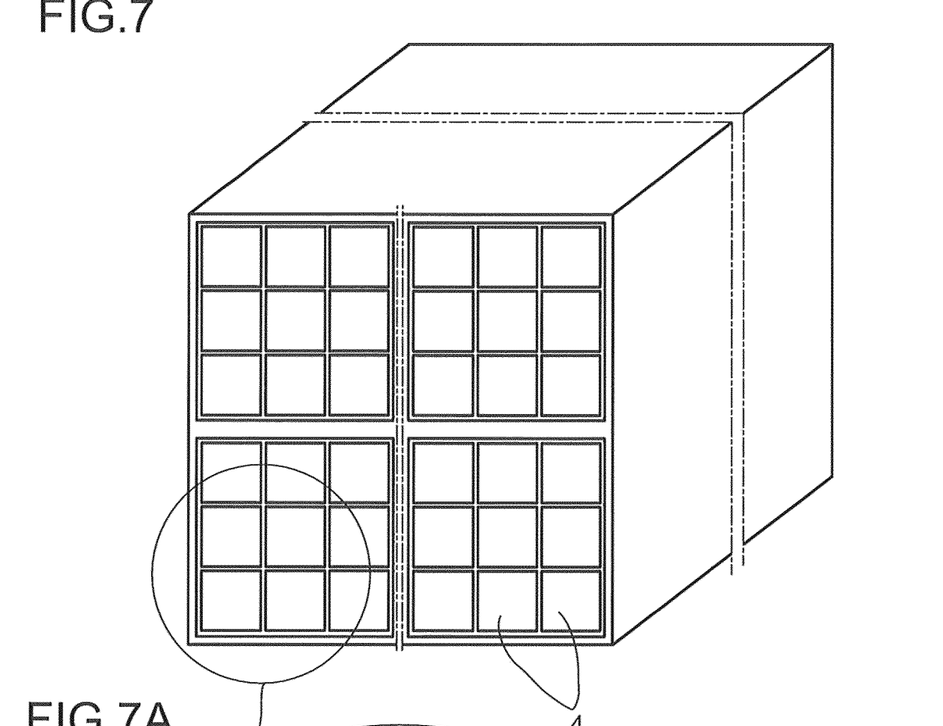

FIG. 7 shows a detail of the structure of a packing 5 composed of monoliths 4 stacked next to and above one another. The packing 5 has 14×14 honeycomb bodies as monoliths 4 in the inflow area. The monoliths 4 are sealed against one another and against the housing by means of sealing plates (expandable mats). This sealing system is intended also to serve for stabilization in order to accommodate the inflow forces and to compensate any unevenness (tolerances) of the monoliths 4. In particular, the expandable mats are intended to prevent the monoliths 4 from shifting in the flow direction.

In the preferred embodiment, 17 or 18, for example, monoliths are arranged in the flow direction.

Figure 7A:
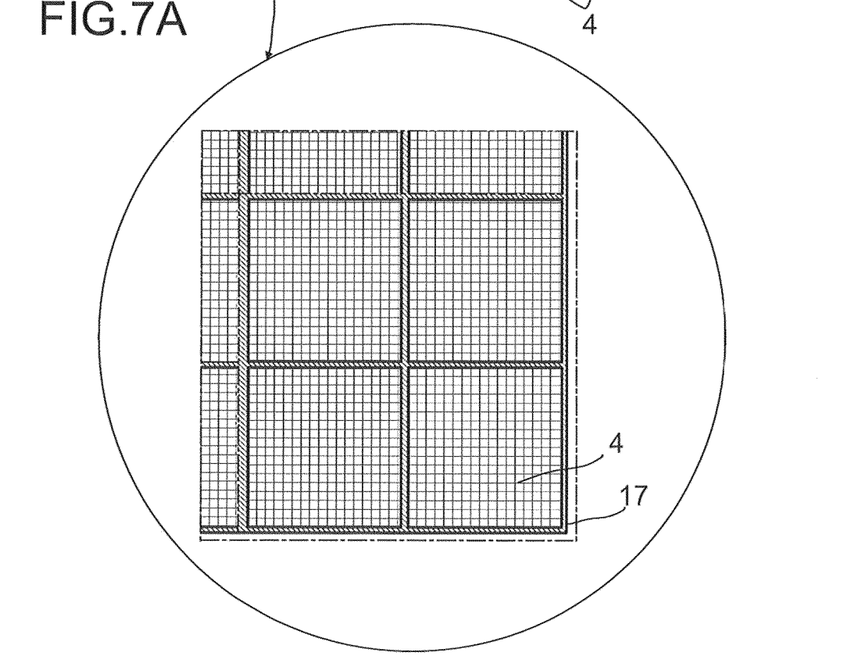

FIG. 7A shows a detail of the depiction in FIG. 7, with preferred dimensions in millimeters for the individual monoliths 4 and the distances between them.

Figure 8:
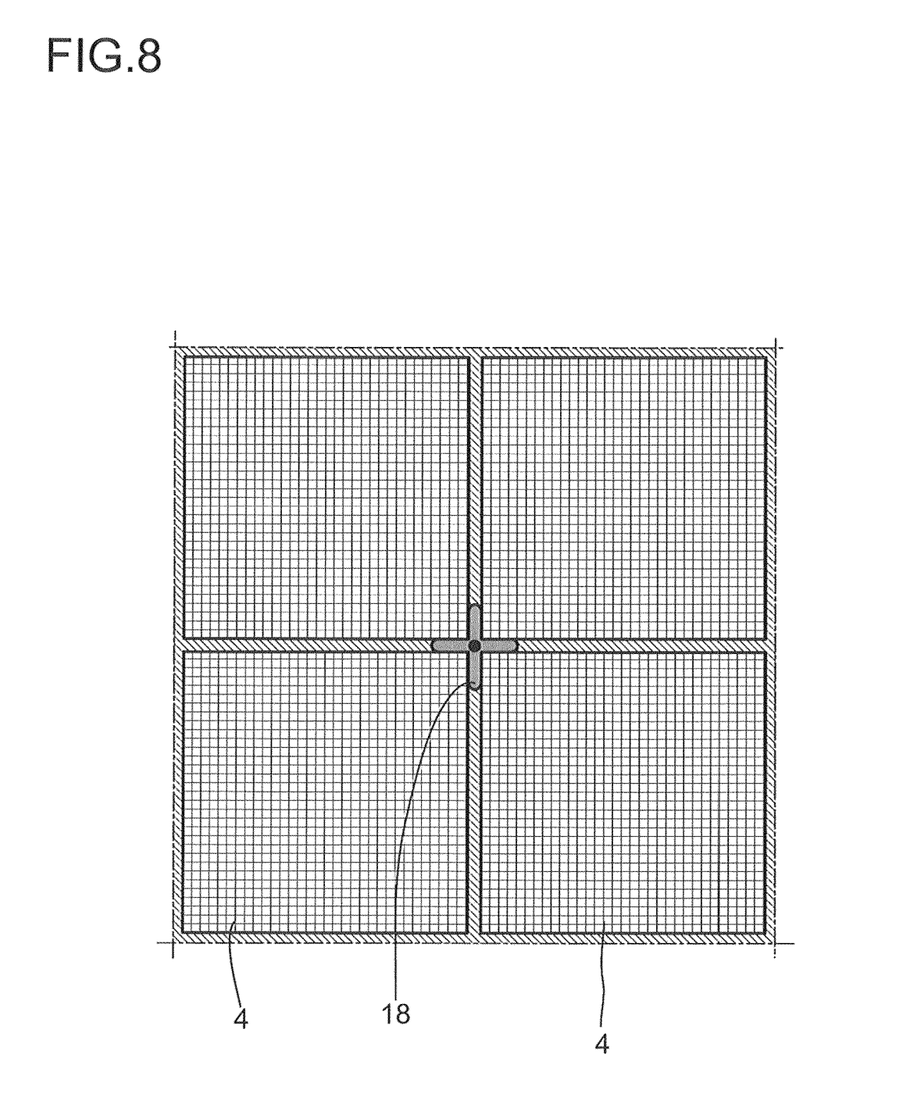

FIG. 8 shows a further, preferred mounting of the individual monoliths (honeycomb bodies) 4 by means of holding devices 18 which are, for example, configured as stabilizing webs. The holding device 18 comprises conical elements which have a defined geometry and are clamped between the monoliths 4 and stabilized by means of a tensioning system. The conical geometry is necessary to prevent the monoliths from becoming blocked. The figure shows a conical corner element with central opening for the tensioning wire. This type of construction is necessary to counter the pressure drop forces.

In addition, it is possible to clad the monoliths 4 with a partially elastic ceramic composition.

Figure 9:
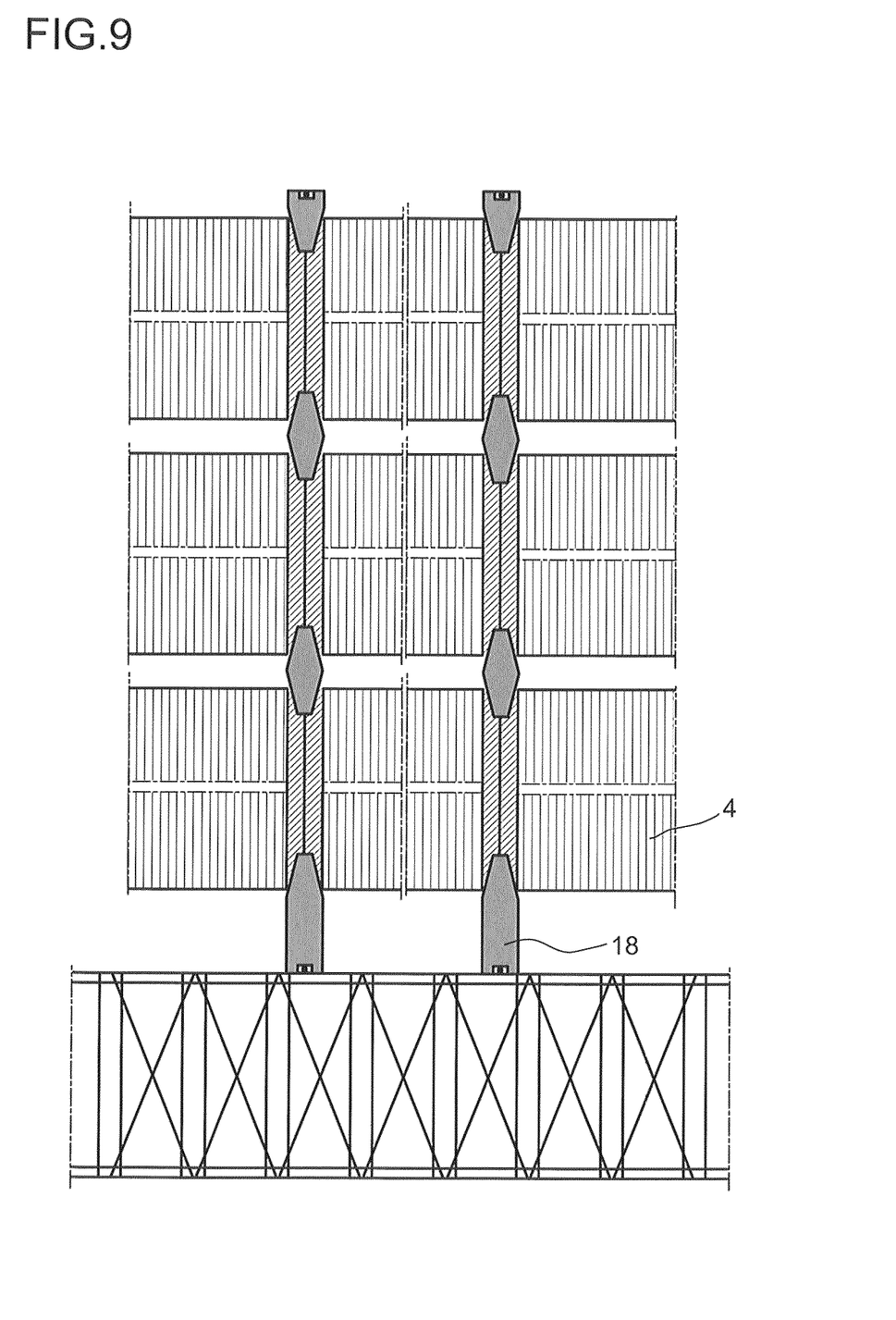
FIG. 9 shows a further schematic depiction of a part of a packing with holding devices between the monoliths.

The schematic depiction in FIG. 9 shows the holding device 18 which is formed by conical elements and in which the conical elements are stabilized by means of a tensioning system. It is particularly advisable for the conical elements to be arranged in the corner regions of the monoliths 4. The other intermediate spacing between the monoliths 4 is, as usual, closed by means of sealing material.

A packing stabilized in this way can also, as indicated schematically in FIG. 9, serve for a vertical arrangement of the monoliths.

LIST OF REFERENCE NUMERALS

1 reactor
2 hydrocarbon stream
3 $O_2$-comprising gas stream
4 monoliths
5 packing composed of 4
6 mixing zone
7 feed line for 2
8 flow equalizer
9 feed line for 3
10 distributor chamber for 3 in each mixing zone 6
11 discharge line for the reaction gas mixture
12 heat exchanger
13 transition part from rectangular to round cross section
14 plug-in tube
15 outlet openings for $O_2$-comprising gas stream 3 from the plug-in tube 14
16 mixing element
17 sealing plates between the monoliths 4
18 stabilization web (holding device)

The invention claimed is:

1. A reactor in the form of an essentially horizontal cylinder for carrying out an autothermal gas-phase dehydrogenation of a hydrocarbon-comprising gas stream by means of an oxygen-comprising gas stream to give a reaction gas mixture over a heterogeneous catalyst configured as monolith, wherein the interior of the reactor is divided by a detachable, cylindrical or prismatic housing G which is arranged in the longitudinal direction of the reactor and is gastight in the circumferential direction and open at two end faces of the housing into an inner region A having one or more catalytically active zones, in which a packing composed of monoliths stacked on top of one another, next to one another and behind one another and before each catalytically active zone in each case a mixing zone having solid internals are provided, and an outer region B arranged coaxially to the inner region A, with one or more feed lines for the hydrocarbon-comprising gas stream to be dehydrogenated into the outer region B, deflection of the hydrocarbon stream to be dehydrogenated at one end of the reactor and introduction via a flow equalizer into the inner region A, with one or more feed lines which can be regulated independently of one another, where each feed line supplies one or more distribution chambers for the oxygen-comprising gas stream into each of the mixing zones and with a discharge line for the reaction gas mixture of the autothermal gas-phase dehydrogenation.

2. The reactor according to claim 1, wherein the hydrocarbon-comprising gas stream to be dehydrogenated is introduced at one end of the reactor into the outer region B, deflected at the other end of the reactor and introduced via a flow equalizer into the inner region A.

3. The reactor according to claim 1, wherein the housing G arranged therein is configured as a cuboid.

4. The reactor according to claim 1, wherein two or more catalytically active zones each having a packing composed of monolith stacked on top of, next to and behind one another are provided in the inner region A.

5. The reactor according to claim 1, wherein the monoliths which are stacked next to, above and behind one another to form a packing are enveloped in an expandable mat or a mineral fiber nonwoven and installed in a housing with a tensioning device.

6. The reactor according to claim 3, wherein the side walls of the housing G configured as a cuboid can be taken off individually so that a complete packing or individual monoliths of a packing from a catalytically active zone can be replaced.

7. The reactor according to claim 1, wherein the housing G is made of a material which is heat-resistant but without pressure vessel approval.

8. The reactor according to claim 1, wherein the outer wall of the reactor is made of an alloy steel approved for pressure vessels.

9. The reactor according to claim 1, wherein each mixing zone comprises a tube distributor formed by a plurality of parallel plug-in tubes which are arranged in a plane perpendicular to the longitudinal direction of the reactor and are connected to one or more of the distributor chambers and have a plurality of uniformly spaced outlet openings for the oxygen-comprising gas stream from the plug-in tube and also a plurality of uniformly spaced mixing elements.

10. The reactor according to claim 9, wherein the mixing elements are configured as mixing plates.

11. The reactor according to claim 1, wherein a shell-and-tube heat exchanger having a bundle of tubes through which the reaction gas mixture for the autothermal gas-phase dehydrogenation is passed and also intermediate spaces between the tubes through which the hydrocarbon-comprising gas stream to be dehydrogenated is passed in countercurrent to the reaction mixture of the autothermal gas-phase dehydrogenation is provided at the end of the reactor at which the discharge line for the reaction gas mixture from the autothermal gas-phase dehydrogenation is located.

12. The reactor according to claim 11, wherein the shell-and-tube heat exchanger is made of a highly heat-resistant stainless steel, the tubes of the shell-and-tube heat exchanger are installed at both ends of the tubes in tube plates without leaving a gap by backplate welding and the tube plates of the shell-and-tube heat exchanger are clad on the hot gas side of the heat exchanger with a heat-resistant stainless steel.

13. The reactor according to claim 11, wherein the shell-and-tube heat exchanger is made of a nickel-chromium-iron alloy.

14. The reactor according to claim 10, wherein the feed lines for the oxygen-comprising gas stream, the distributor chambers, the plug-in tubes and the mixing elements for the oxygen-comprising gas stream are made of a highly heat-resistant nickel-chromium-iron alloy in each mixing zone, where the total proportion of nickel and chromium is at least 90% by weight of the total mass of the alloy and the nickel/chromium ratio is in the range from about 1.5 to 5.5.

15. A process for carrying out an autothermal gas-phase dehydrogenation, comprising:
    carrying out, in a reactor, having the form of an essentially horizontal cylinder, an autothermal gas-phase dehydrogenation of a hydrocarbon-comprising gas stream by means of an oxygen-comprising gas stream to give a reaction gas mixture over a heterogeneous catalyst configured as monolith, wherein
        the interior of the reactor is divided by a detachable, cylindrical or prismatic housing G which is arranged in the longitudinal direction of the reactor and is gastight in the circumferential direction and open at two end faces of the housing into an inner region A having one or more catalytically active zones, in which a packing composed of monoliths stacked on top of one another, next to one another and behind one another and before each catalytically active zone in each case a mixing zone having solid internals are provided, and
        an outer region B arranged coaxially to the inner region A,
        with one or more feed lines for the hydrocarbon-comprising gas stream to be dehydrogenated into the outer region B, deflection of the hydrocarbon stream to be dehydrogenated at one end of the reactor and introduction via a flow equalizer into the inner region A,
        with one or more feed lines which can be regulated independently of one another, where each feed line supplies one or more distribution chambers for the oxygen-comprising gas stream into each of the mixing zones, and
        with a discharge line for the reaction gas mixture of the autothermal gas-phase dehydrogenation.

16. The process according to claim 15, wherein the autothermal gas-phase dehydrogenation is a dehydrogenation of propane, butane, of isobutane, of butene to butadiene or of ethylbenzene to styrene.

17. A process for carrying out an autothermal gas-phase dehydrogenation, comprising:
    providing two or more reactors, with at least one reactor being utilized for an autothermal gas-phase dehydrogenation and at least one further reactor being regenerated at the same time, wherein the at least one reactor being utilized for the autothermal gas-phase dehydrogenation has the form of an essentially horizontal cylinder; and
    carrying out, in the at least one reactor being utilized for the autothermal gas-phase dehydrogenation, an autothermal gas-phase dehydrogenation hydrocarbon-comprising as stream by means of an oxygen-comprising gas stream to give a reaction gas mixture over a heterogeneous catalyst configured as monolith, wherein
        the interior of the reactor is divided by a detachable, cylindrical or prismatic housing G which is arranged in the longitudinal direction of the reactor and is gastight in the circumferential direction and open at two end faces of the housing into an inner region A having one or more catalytically active zones, in which a packing composed of monoliths stacked on top of one another, next to one another and behind one another and before each catalytically active zone in each case a mixing zone having solid internals are provided, and
        an outer region B arranged coaxially to the inner region A,
        with one or more feed lines for the hydrocarbon-comprising gas stream to be dehydrogenated into the outer region B, deflection of the hydrocarbon stream to be dehydrogenated at one end of the reactor and introduction via a flow equalizer into the inner region A,
        with one or more feed lines which can be regulated independently of one another, where each feed line supplies one or more distribution chambers for the oxygen-comprising gas stream into each of the mixing zones, and
        with a discharge line for the reaction gas mixture of the autothermal gas-phase dehydrogenation.

* * * * *